(12) United States Patent
Lee et al.

(10) Patent No.: US 9,599,753 B2
(45) Date of Patent: *Mar. 21, 2017

(54) POLARIZING PLATE

(71) Applicant: LG CHEM, LTD., Seoul (KR)

(72) Inventors: Mi-Rin Lee, Daejeon (KR);
Kwang-Seung Park, Daejeon (KR);
Jun-Wuk Park, Daejeon (KR);
Eun-Soo Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 260 days.

This patent is subject to a terminal disclaimer.

(21) Appl. No.: 14/385,726

(22) PCT Filed: Jun. 13, 2014

(86) PCT No.: PCT/KR2014/005228
§ 371 (c)(1),
(2) Date: Sep. 16, 2014

(87) PCT Pub. No.: WO2015/046712
PCT Pub. Date: Apr. 2, 2015

(65) Prior Publication Data
US 2016/0238745 A1   Aug. 18, 2016

(30) Foreign Application Priority Data

Sep. 30, 2013 (KR) ........................ 10-2013-0116996
May 30, 2014 (KR) ........................ 10-2014-0066463

(51) Int. Cl.
*C08F 30/08* (2006.01)
*C08L 39/06* (2006.01)
*G02B 1/18* (2015.01)
*G02B 5/30* (2006.01)
*G02B 1/14* (2015.01)
*B32B 7/12* (2006.01)
*C09D 133/14* (2006.01)
*C09D 4/00* (2006.01)

(52) U.S. Cl.
CPC ................. *G02B 1/18* (2015.01); *B32B 7/12* (2013.01); *C09D 4/00* (2013.01); *C09D 133/14* (2013.01); *G02B 1/14* (2015.01); *G02B 5/3033* (2013.01); *B32B 2255/26* (2013.01); *B32B 2457/20* (2013.01)

(58) Field of Classification Search
USPC ........ 428/1.31, 1.5, 1.6; 359/483.01; 349/96
See application file for complete search history.

(56) References Cited

U.S. PATENT DOCUMENTS

| | | |
|---|---|---|
| 8,344,083 B2 | 1/2013 | Um et al. |
| 2012/0308798 A1 | 12/2012 | Ryu et al. |
| 2013/0126085 A1 | 5/2013 | Suzuki et al. |
| 2013/0279003 A1 | 10/2013 | Seo et al. |
| 2014/0072731 A1 | 3/2014 | Seo et al. |
| 2014/0204317 A1 | 7/2014 | Huh et al. |

FOREIGN PATENT DOCUMENTS

| | | | |
|---|---|---|---|
| CN | 103314317 A | | 9/2013 |
| JP | 2000-230016 A | | 8/2000 |
| JP | 2001-151814 A | | 6/2001 |
| JP | 2002-120326 A | | 4/2002 |
| JP | 2008134384 A | | 6/2008 |
| JP | 2008-233874 A | * | 10/2008 |
| JP | 2009-256554 A | | 11/2009 |
| JP | 2010-043158 A | | 2/2010 |
| KR | 10-2009-0115040 | | 11/2009 |
| KR | 10-2010-0037553 A | | 9/2010 |
| KR | 10-2011-0014555 | | 2/2011 |
| KR | 10-1182468 | | 9/2012 |
| KR | 10-2012-0143970 | * | 12/2012 |
| KR | 10-2013-0040725 | | 4/2013 |
| TW | 201022742 A1 | | 6/2010 |
| TW | 201329532 A1 | | 7/2013 |

* cited by examiner

Primary Examiner — Tae H Yoon
(74) Attorney, Agent, or Firm — Dentons US LLP

(57) ABSTRACT

The present disclosure relates to a polarizing plate excellent durability even under high humidity conditions and more particularly, to a polarizing plate including a polarizer and a protective layer formed on at least one surface of the polarizer, wherein the protective layer is formed of a cured product of a radically curable composition including a compound represented by the following [Chemical Formula 1]; a vinyl ether compound; a carboxylic acid compound including at least one unsaturated double bond; and a radical initiator.

11 Claims, No Drawings

POLARIZING PLATE

This application is a National Stage entry of International Application No. PCT/KR2014/005228, filed on Jun. 13, 2014, which claims priority to Korean Patent Application Nos. 10-2013-0116996, filed on Sep. 30, 2013 and 10-2014-0066463, filed on May 30, 2014, with the Korean Intellectual Property Office, all of which are incorporated herein in their entirety by reference.

TECHNICAL FIELD

The present disclosure relates to a polarizing plate and more particularly, to a polarizing plate including a radically curable protective layer formed on a surface thereof.

BACKGROUND ART

Polarizing plates according to the related art generally have a structure in which protective films are attached to both surfaces of a polarizer formed of a polyvinyl alcohol (hereinafter, referred to as 'PVA')-based resin dyed with a dichroic dye or iodine, using an adhesive. However, as of late, as the thinning of display devices has proceeded, the development of single-sided polarizing plates respectively including a protective film only formed on one surface of a polarizer and a pressure sensitive adhesive (PSA) directly formed on the other surface of the polarizer, without the protective film, has been undertaken. However, in the case of single-sided polarizing plates including the pressure sensitive adhesive (PSA) directly formed on the polarizer as described above, since durability properties thereof may be defective, cracks may be easily generated in the polarizer under severe conditions. Further, curling may be caused due to a difference in shrinkage rates between the protective film and the pressure sensitive adhesive (PSA), thereby leading to a light leakage phenomenon in the case that the polarizing plate is mounted on a display device.

In order to solve the limitations as described above, a technology of forming a protective layer between a polarizer and a pressure sensitive adhesive (PSA) of a single-sided polarizing plate using a curable resin has been suggested. Korean Patent Laid-Open Publication No. 2011-0014555 teaches a polarizing plate including a protective layer provided between a polarizer and a pressure sensitive adhesive (PSA) and having a tensile modulus of 100 MPa or above. However, in the case of a hydroxyethyl acrylate resin used as a protective layer forming agent in the Patent Publication, durability and optical characteristics of the polarizing plate may be deteriorated under high humidity conditions due to low water resistance and glass transition temperature properties thereof.

DISCLOSURE

Technical Problem

An aspect of the present disclosure provides a polarizing plate having a reduced thickness and superior characteristics even under high humidity conditions.

Technical Solution

According to an aspect of the present disclosure, there is provided a polarizing plate including: a polarizer and a protective layer formed on at least one surface of the polarizer, wherein the protective layer is formed of a cured product of a radically curable composition including a compound represented by the following [Chemical Formula 1]; a vinyl ether compound; a carboxylic acid compound including at least one unsaturated double bond; and a radical initiator,

[Chemical Formula 1]
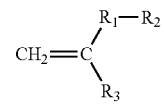

where $R_1$ is an ester group or an ether group,
$R_2$ is a $C_{1-10}$ alkyl group having at least one hydroxy substituent or a $C_{4-20}$ cycloalkyl group having at least one hydroxy substituent, and $R_3$ is hydrogen or a $C_{1-10}$ alkyl group.

In this case, the radically curable composition may include: 40 to 90 parts by weight of the compound represented by [Chemical Formula 1]; 1 to 50 parts by weight of the vinyl ether compound; 1 to 50 parts by weight of the carboxylic acid compound including at least one unsaturated double bond; and 0.5 to 10 parts by weight of the radical initiator, based on 100 parts by weight of the total composition.

Meanwhile, the compound represented by [Chemical Formula 1] may be at least one selected from among compounds represented by the following [Chemical Formula 2] to [Chemical Formula 9]:

[Chemical Formula 2]
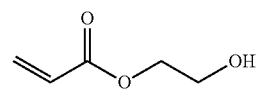

[Chemical Formula 3]
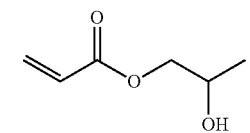

[Chemical Formula 4]
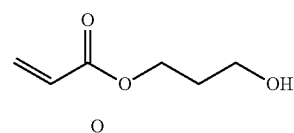

[Chemical Formula 5]
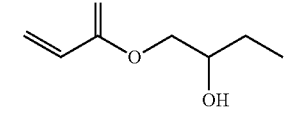

[Chemical Formula 6]
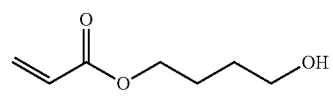

[Chemical Formula 7]
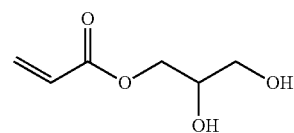

[Chemical Formula 8]
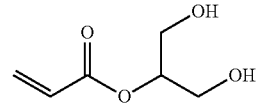

[Chemical Formula 9]

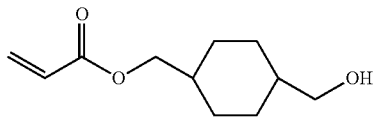

In addition, the vinyl ether compound may be at least one selected from a group consisting of ethylene glycol monovinyl ether, 1,4-buthanol vinyl ether, di(ethylene glycol) divinyl ether, tri(ethylene glycol) divinyl ether, tert-butyl vinyl ether, 1-(vinyloxy)-2,2-bis((vinyloxy)methyl)butane, 1,3-bis(vinyloxy)-2,2-bis((vinyloxy)methyl)propane and cyclohexyl vinylether. The carboxylic acid compound including at least one unsaturated double bond may be at least one selected from a group consisting of a maleic acid, a fumaric acid, an angelic acid and a tiglic acid.

Meanwhile, the radically curable composition may further include: a compound having an acid value of 100 to 1000 mgKOH/g, if necessary. In this case, the compound having an acid value of 100 to 1000 mgKOH/g may be included in an amount of approximately 10 to 50 parts by weight, based on 100 parts by weight of the radically curable composition.

In addition, the radically curable composition may further include: a photoacid generator, if necessary. The photoacid generator may be included in an amount of approximately 0.5 to 10 parts by weight, based on 100 parts by weight of the radically curable composition.

A glass transition temperature of the radically curable composition may be 60° C. or more.

Meanwhile, the polarizing plate may further include a protective film attached to a surface of the polarizer, opposite to the surface thereof on which the protective layer is formed, via an adhesive layer. In this case, as the protective film, protective films formed of various materials generally known in the technical field, for example, a cellulose film, an acrylic film, a cycloolefin polymer (COP) film, a polyethylene terephthalate (PET) film, and the like may be used without limitations.

In addition, the polarizing plate may further include a pressure sensitive adhesive (PSA) formed on the protective layer.

According to another aspect of the present disclosure, there is provided a display device including the polarizing plate as described above.

Advantageous Effects

In the polarizing plate according to an exemplary embodiment of the present disclosure, since a vinyl ether compound and a carboxylic acid compound are copolymerized with each other to form a complex having superior water resistance properties during the curing of a protective layer, excellent durability and optical properties even under high humidity conditions may be maintained in the polarizing plate.

Further, since a glass transition temperature of a radically curable composition forming the protective layer according to an exemplary embodiment of the present disclosure is high, a polarizing plate according to an exemplary embodiment of the present disclosure including the protective layer formed using the radically curable composition may have high heat resistance reliability.

BEST MODE

Hereinafter, exemplary embodiments of the present disclosure will be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of repeated research in order to develop a thin polarizing plate having excellent durability as well as high heat resistance reliability even under high humidity conditions, the inventors of the disclosure found that in the case of forming a protective layer on at least one surface of a polarizer by curing a resin composition manufactured by mixing a compound containing a hydroxyl group, a vinyl ether compound, and a carboxylic acid compound, the objects as described above could be achieved, and then completed the disclosure.

More specifically, the polarizing plate according to an embodiment of the present disclosure may include: a polarizer and a protective layer formed on at least one surface of the polarizer, and in this case, the protective layer may be formed of a cured product of a radically curable composition including a compound represented by the following [Chemical Formula 1]; a vinyl ether compound; a carboxylic acid compound including at least one unsaturated double bond; and a radical initiator,

[Chemical Formula 1]

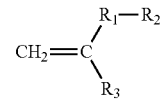

where $R_1$ is an ester group or an ether group, $R_2$ is a $C_{1-10}$ alkyl group or a $C_{4-10}$ cycloalkyl group having at least one hydroxy substituent, and $R_3$ is hydrogen or a $C_{1-10}$ alkyl group. In this case, in $R_2$, the alkyl group may be a linear or branched chain alkyl, and the hydroxyl group may be substituted in arbitrary position in the alkyl group or the cycloalkyl group. That is, the hydroxyl group may be located in an arbitrary position of the alkyl group or at a terminal of the alkyl group.

More preferably, the radically curable composition according to an exemplary embodiment of the present disclosure may include: 40 to 90 parts by weight of the compound represented by the [Chemical Formula 1]; 1 to 50 parts by weight of the vinyl ether compound; 1 to 50 parts by weight of the carboxylic acid compound including at least one unsaturated double bond; and 0.5 to 10 parts by weight of the radical initiator, based on 100 parts by weight of the total composition.

Meanwhile, as the compound represented by the [Chemical Formula 1], a constituent enabling the protective layer to be adhered to the polarizer, various compounds represented by the [Chemical Formula 1] may be used. For example, in an exemplary embodiment of the present disclosure, the compound represented by the [Chemical Formula 1] is not limited, but may be at least one compound selected from among compounds represented by the following [Chemical Formula 2] to [Chemical Formula 9]:

[Chemical Formula 2]

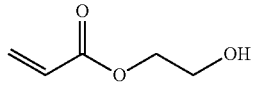

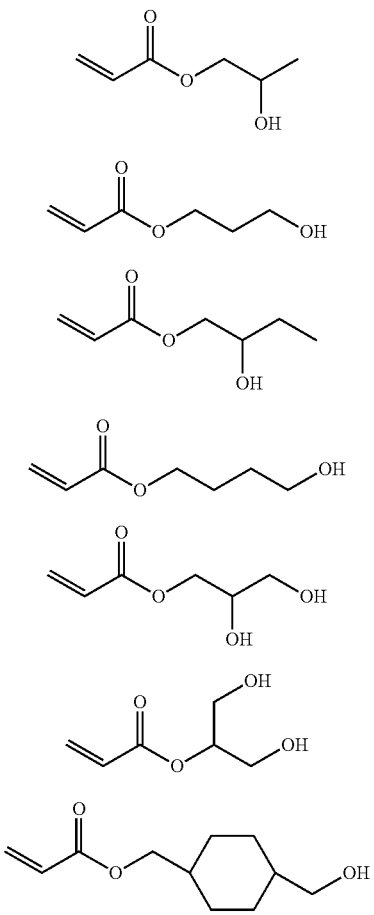

In this case, the compound represented by the [Chemical Formula 1] may be included in an amount of approximately 40 to 90 parts by weight, preferably, approximately 50 to 80 parts by weight, more preferably, approximately 60 to 80 parts by weight, based on 100 parts by weight of the total composition. In a case in which the compound represented by the [Chemical Formula 1] is included in an amount of less than 40 parts by weight, guaranteeing adhesion properties may be difficult. In a case in which the compound represented by [Chemical Formula 1] is included in an amount of greater than 80 parts by weight, a glass transition temperature of the protective layer may be lowered, thereby degrading heat resistance properties.

Next, the vinyl ether compound, a constituent for forming a complex through a copolymerization reaction with the carboxylic acid compound to be described later during the curing of the protective layer to thereby provide moisture resistance properties, is not limited to, but may be at least one selected from a group consisting of ethylene glycol monovinyl ether, 1,4-buthanol vinyl ether, di(ethylene glycol) divinyl ether, tri(ethylene glycol) divinyl ether, tert-butyl vinyl ether, 1-(vinyloxy)-2,2-bis((vinyloxy)methyl) butane, 1,3-bis(vinyloxy)-2,2-bis((vinyloxy)methyl) propane and cyclohexyl vinylether.

Meanwhile, the vinyl ether compound may be included in an amount of approximately 1 to 50 parts by weight, preferably, approximately 1 to 40 parts by weight, more preferably, approximately 1 to 30 parts by weight, based on 100 parts by weight of the total composition. In a case in which the content of the vinyl ether compound satisfies the numerical range, high durability may be maintained under high humidity conditions.

Next, the carboxylic acid compound including at least one unsaturated double bond, a constituent for forming the complex through the copolymerization reaction with the vinyl ether compound during the curing of the protective layer to thereby provide moisture resistance properties, is not limited to, but may be at least one selected from a group consisting of a maleic acid, a fumaric acid, an angelic acid and a tiglic acid.

The carboxylic acid compound may be included in an amount of approximately 1 to 50 parts by weight, preferably, approximately 1 to 40 parts by weight, more preferably, approximately 1 to 30 parts by weight, based on 100 parts by weight of the total composition. In a case in which the content of the carboxylic acid compound satisfies the numerical range, high durability may be maintained under high humidity conditions.

In the case of a protective layer formed of a radically curable composition according to the related art, a hydroxyl group contained in the protective layer and a hydroxyl group present in a surface of a polyvinyl alcohol (PVA) film may form a hydrogen bond to thereby allow for the securing of adhesion properties. However, under high humidity conditions, the hydroxyl group present in the surface of the polyvinyl alcohol (PVA) film may form a hydrogen bond with moisture and consequently, adhesion between the protective layer and the polarizer may be degraded. However, in the case of the radically curable composition according to an exemplary embodiment of the present disclosure, since the complex may be formed through the copolymerization reaction between the vinyl ether compound and the carboxylic acid compound during the curing of adhesive and a carboxylic acid contained in the complex may be first bonded to moisture under high humidity conditions, the hydrogen bond between the hydroxyl group present in the surface of the polyvinyl alcohol (PVA) film and the hydroxyl group contained in the protective layer may be maintained, thereby suppressing a lowering of adhesion properties.

Next, the radical initiator included in the radically curable composition according to an exemplary embodiment of the present disclosure may be provided to accelerate radical polymerization to improve a curing rate. In this case, as the radical initiator, any radical initiator generally used in the technical field may be used without limitations. For example, the radical initiator may be at least one selected from a group consisting of 1-hydroxy-cyclohexyl-phenyl-ketone, 2-hydroxy-2-methyl-1-phenyl-1-propanone, 2-hydroxy-1-[4-(2-hydroxyethoxy) phenyl]-2-methyl-1-propanone, methylbenzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl (2,4,6-trimethylbenzoyl)-phosphine oxide, and phenylbis(2,4,6-trimethyl benzoyl) phosphine oxide. In particular, in an exemplary embodiment of the present disclosure, the radical initiator may preferably be phenylbis(2,4,6-trimethyl benzoyl) phosphine oxide.

Meanwhile, the radical initiator may be, for example, included in an amount of approximately 0.5 to 10 parts by weight, approximately 1 to 5 parts by weight, or approximately 2 to 3 parts by weight, based on 100 parts by weight of the radically curable composition. In a case in which the content of the radical initiator satisfies the numerical range, the curing of the protective layer may be smoothly undertaken.

Meanwhile, the radically curable composition according to an exemplary embodiment of the present disclosure may further include a compound having an acid value of 100 to 1000 mgKOH/g, if necessary. The acid value of the compound may be for example, approximately 300 mgKOH/g or may be approximately 300 to 900 mgKOH/g. In a case in which the radically curable composition further includes the compound having a high acid value as described above, the glass transition temperature of the protective layer may be increased while a adhesiveness between the protective layer and the polarizer may not be reduced, such that high heat resistance properties may be implemented. Meanwhile, in this case, the acid value refers to the number of mg of KOH required to completely neutralize 1 g of a sample.

Meanwhile, as the compound having an acid value of 100 to 1000 mgKOH/g, any compound compatible with the radically curable composition according to an exemplary embodiment of the present disclosure and satisfying the acid value range may be used without limitations. For example, the compound having an acid value of 100 to 1000 mgKOH/g may be at least one selected from a group consisting of compounds represented by the following [Chemical Formula 10] to [Chemical Formula 21]:

[Chemical Formula 10]

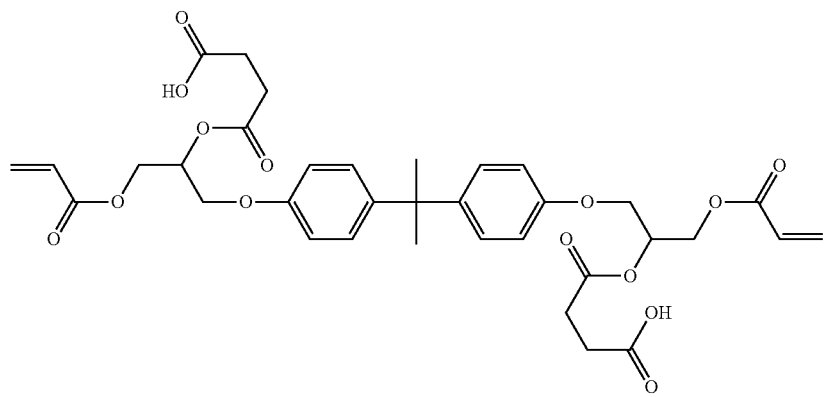

[Chemical Formula 11]

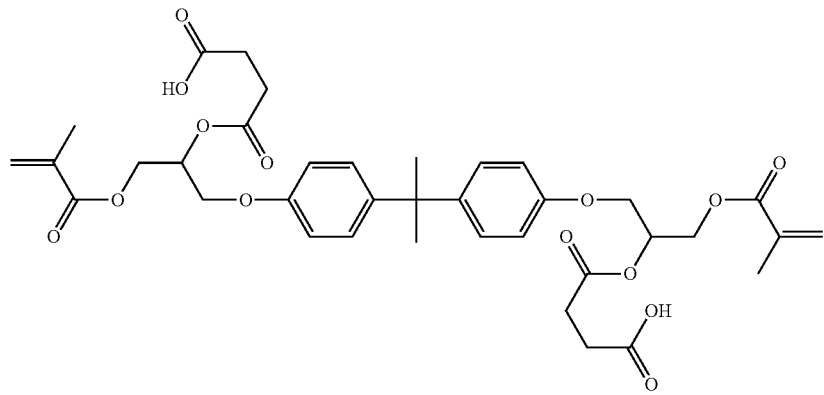

[Chemical Formula 12]

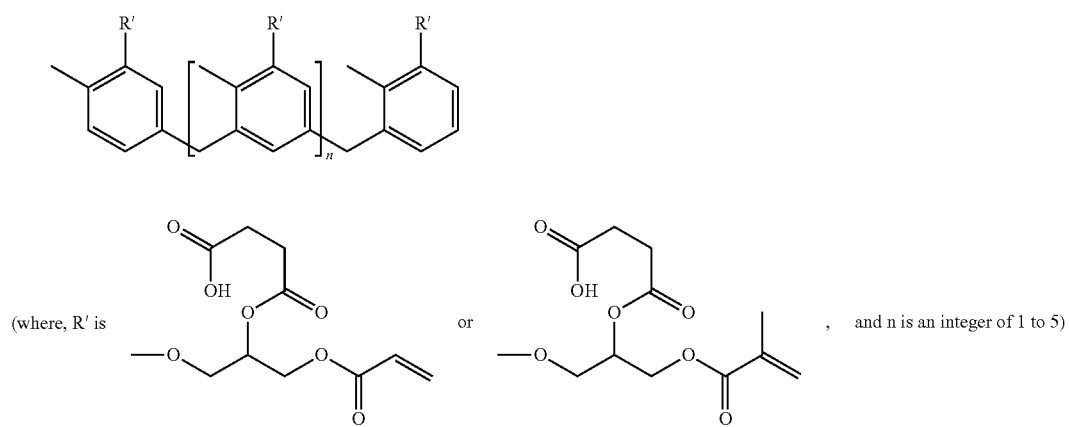

[Chemical Formula 13]
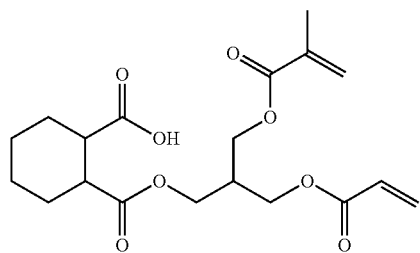
[Chemical Formula 14]
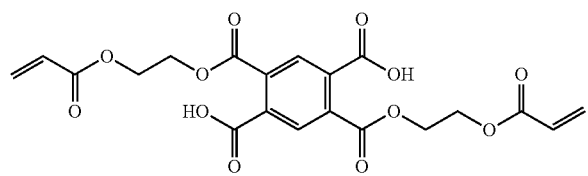
[Chemical Formula 15]
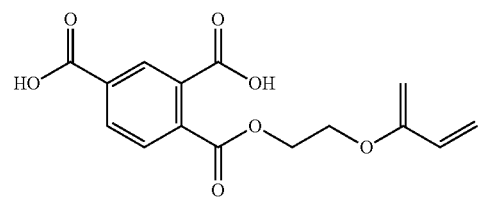
[Chemical Formula 16]
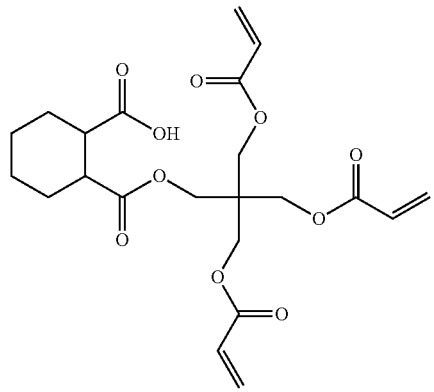
[Chemical Formula 17]
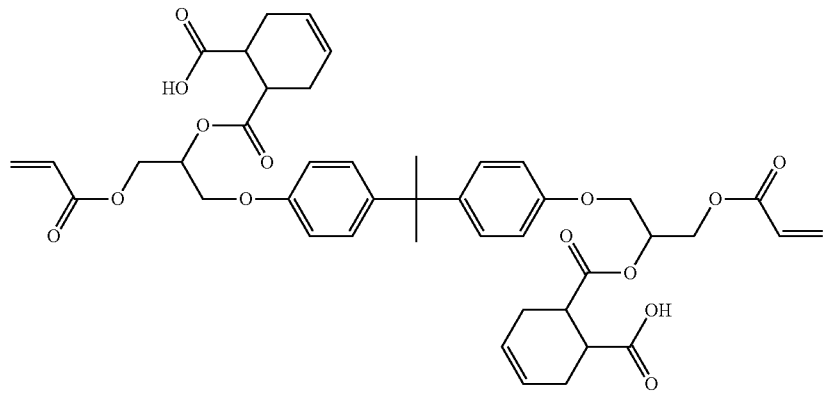
[Chemical Formula 18]
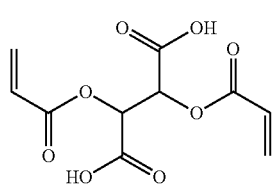
[Chemical Formula 19]
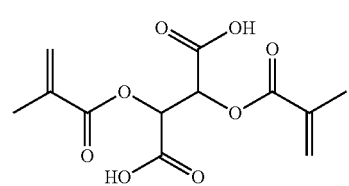

-continued

[Chemical Formula 20]

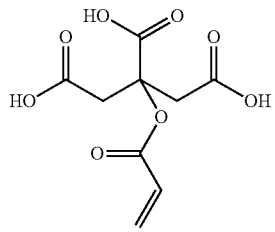

[Chemical Formula 21]

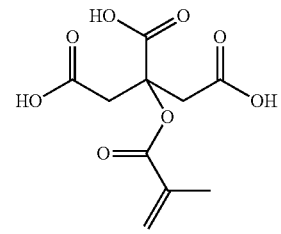

Meanwhile, the compound having an acid value of 100 to 1000 mgKOH/g may be included in an amount of approximately 10 to 50 parts by weight or approximately 10 to 30 parts by weight, based on 100 parts by weight of the radically curable composition. In a case in which the content of the compound having an acid value of 100 to 1000 mgKOH/g satisfies the numerical range, excellent adhesion properties between the polarizer and the protective layer formed of the composition and excellent heat resistance properties may be exhibited.

Meanwhile, the radically curable composition according to an exemplary embodiment of the present disclosure may further include a photoacid generator, if necessary. The photoacid generator may be a compound generating acids (H+) by active energy rays and in a case in which the radically curable composition further includes the photoacid generator, an acid value of the radically curable composition may be adjusted through the photoacid generator, whereby adhesion properties between the polarizer and the protective layer formed of the composition may be further improved.

The photoacid generator usable in an exemplary embodiment of the present disclosure may contain sulfonium salts or iodonium salts. Specific examples of the photoacid generator containing sulfonium salts or iodonium salts may be at least one selected from a group consisting of diphenyl(4-phenylthio)phenylsulfonium hexafluoroantimonate, diphenyl(4-phenylthio)phenylsulfonium hexafluorophosphate, (phenyl)[4-(2-methylpropyl) phenyl]-iodonium hexafluorophosphate, (thiodi-4,1-phenylene)bis(diphenylsulfonium) dihexafluoroantimonate, and (thiodi-4,1-phenylene)bis(diphenylsulfonium) dihexafluorophosphate, but are not limited thereto.

Meanwhile, the photoacid generator may be included in an amount of approximately 10 parts by weight or less, preferably 0.5 to 10 parts by weight, 1 to 6 parts by weight or 3 to 5 parts by weight, based on 100 parts by weight of the radically curable composition. In a case in which the content of the photoacid generator included in the radically curable composition according to an exemplary embodiment of the present disclosure satisfies the numerical range, adhesion properties between the protective layer containing the photoacid generator and the polarizer may be further improved as compared to the case in which the photoacid generator is not contained or the content of the photoacid generator is outside of the numerical range.

Meanwhile, the acid value of the radically curable composition according to an exemplary embodiment of the present disclosure may preferably be, for example, approximately 60 to 300 mgKOH/g, 80 to 200 mgKOH/g, or 100 to 150 mgKOH/g. In a case in which the acid value of the radically curable composition according to an exemplary embodiment of the present disclosure satisfies the numerical range, adhesion between the protective layer formed of the radically curable composition and the polarizer may be maintained and Tg of the composition may be improved, such that a polarizing plate having high heat resistance properties may be manufactured.

Further, a glass transition temperature of the radically curable composition according to an exemplary embodiment of the present disclosure after the curing thereof may be approximately 60° C. to 500° C. and for example, may be 60° C. to 300° C., 80° C. to 300° C. or 90° C. to 200° C. The polarizing plate manufactured using the radically curable composition having the glass transition temperature within the numerical range as described above according to an exemplary embodiment of the present disclosure may have superior heat resistance and water resistance properties.

Next, a viscosity of the radically curable composition according to an exemplary embodiment of the present disclosure may preferably be approximately 10 to 300 cp or 20 to 100 cp. In a case in which the viscosity of the radically curable composition satisfies the numerical range, a thickness of the protective layer may be reduced and excellent working properties may be secured due to a low degree of viscosity.

In addition, the thickness of the protective layer formed using the radically curable composition may be 0.1 μm to 20 μm or 0.5 μm to 5 μm. In a case in which the thickness of the protective layer satisfies the numerical range, a polarizing plate having high heat resistance properties may be manufactured.

In a case in which the protective layer is formed using the radically curable composition according to an exemplary embodiment of the present disclosure as described above, since the protective layer has excellent water resistance properties, damage to the polarizer may be low even when the polarizing plate is exposed to high humidity environments, whereby superior optical characteristics may be maintained. Furthermore, since the radically curable composition according to an exemplary embodiment of the present disclosure has a rapid curing rate and a high curing degree, improvements in productivity at the time of manufacturing the polarizing plate may be feasible.

The polarizing plate according to an exemplary embodiment of the present disclosure may be manufactured by a method of forming a protective layer by performing curing after applying the radically curable composition as described above to at least one surface of a polarizer. In this case, the applying may be performed by coating methods commonly known in the technical field such as a spin coating method, a bar coating method, a roll coating method and the like, for example. In addition, the curing may be performed by irradiating active energy rays such as ultraviolet rays, electron beams or the like.

Meanwhile, the polarizer is not particularly limited, but a polarizer commonly known in the technical field, for example, a film formed of polyvinyl alcohol containing iodine or dichromatic dyes, may be used. The polarizer may be manufactured by dyeing a PVA film with iodine or dichromatic dyes, but a manufacturing method thereof is not particularly limited.

Meanwhile, the polarizing plate according to an exemplary embodiment of the present disclosure may further include a protective film attached to one surface of the polarizer via an adhesive layer. In this case, the protective film may preferably be attached to a surface of the polarizer on which the protective layer is not formed, but the present disclosure is not limited thereto.

Meanwhile, the adhesive layer may be formed using various types of adhesive for a polarizing plate, commonly known in the technical field, for example, a polyvinyl alcohol adhesive, an acrylic adhesive, an epoxy adhesive, a urethane adhesive or the like. More specifically, after the adhesive as described above is applied to one surface of the protective film or the polarizer, the polarizer and the protective film are laminated and subsequently, the adhesive may be cured by applying heat or active energy rays thereto, whereby the protective film may be attached to the polarizer.

Meanwhile, as the protective film, a protective film formed of various materials generally known in the technical field, for example, a cellulose film, a polyethylene terephthalate (PET) film, a cycloolefin polymer (COP) film, an acrylic film or the like may be used without limitations. Among these, the acrylic film may be preferably used in consideration of optical characteristics, durability, economic feasibility and the like.

In this case, the acrylic film refers to a film including a (meth)acrylate component and for example, may be obtained by extruding a forming material containing a (meth)acrylate resin as a main component.

More specifically, the acrylic film may be a film including a copolymer having an alkyl(meth)acrylate unit and a styrene unit, and an aromatic resin having a carbonate group at a main chain thereof, or a film including an alkyl(meth)acrylate unit, a styrene unit, 3 to 6-membered heterocyclic unit substituted with at least one carbonyl group, and a vinyl cyanide unit.

Alternatively, the acrylic film may be a film including a (meth)acrylate resin having an aromatic ring. An example of the (meth)acrylate resin having the aromatic ring is a resin composition described in Korean Patent Laid Open Publication No. 10-2009-0115040 and including (a) a (meth)acrylate unit including one or more (meth)acrylate derivatives; (b) an aromatic unit having a chain with a hydroxyl group-contained part, and an aromatic part; and (c) a styrene unit including one or more styrene derivatives. The units (a) to (c) may be contained in individual copolymer forms in the resin composition, or two or more of the units (a) to (c) may be contained in a single copolymer form in the resin composition.

Alternatively, the acrylic film may be a film including an acrylic resin having a lactone ring structure. A concrete example of the (meth)acrylate resin having the lactone ring structure is described in Japanese Patent Laid Open Publication No. 2000-230016, Japanese Patent Laid Open Publication No. 2001-151814, Japanese Patent Laid Open Publication No. 2002-120326, and the like.

A method of manufacturing the acrylic film is not particularly limited, but the acrylic film may be manufactured in such a manner that a (meth)acrylate resin, a polymer, an additive, and the like are sufficiently mixed with one another through any appropriate mixing method to manufacture a thermoplastic resin composition and the composition is then formed as a film, or may be manufactured in such a manner that a (meth)acrylate resin, a polymer, an additive, and the like are fabricated as separate solutions and mixed with one another to form a uniform mixture solution and the mixture solution is then formed as a film.

The thermoplastic resin composition may be manufactured by extrusion-kneading a mixture obtained by free-blending raw materials of the film using any appropriate blender such as an Omni blender or the like. In this case, the blender used in the extrusion-kneading is not particularly limited, and for example, any appropriate blender including an extruder such as a single screw extruder or a double screw extruder, a pressing kneader or the like may be used therefor.

A method of forming the film may be any appropriate method of forming a film, such as a solution casting method (solution emulsifying method), a melt extrusion method, a calendaring method, a compressive molding method or the like. Among the foregoing film forming methods, the solution casting method (solution emulsifying method) and the melt extrusion method may be preferable.

Examples of a solvent used in the solution casting method (solution emulsifying method) may include: aromatic hydrocarbons such as benzene, toluene, xylene, and the like; aliphatic hydrocarbons such as cyclohexane, decalin, and the like; esters such as acetic acid ethyl, acetic acid butyl and the like; ketones such as acetone, methyl ethyl ketone, methyl isobutyl ketone, and the like; alcohols such as methanol, ethanol, isopropanol, butanol, isobutanol, methyl cellosolve, ethyl cellosolve, butyl cellosolve, and the like; ethers such as tetrahydrofuran, dioxane, and the like; halogenated hydrocarbons such as dichloromethane, chloroform, carbon tetrachloride, and the like; dimethylformamide; dimethyl sulfoxide, and the like. These solvents may be used alone or in combinations of two or more thereof.

Examples of an apparatus for performing the solution casting method (solution emulsifying method) may include a drum type casting machine, a band type casting machine, a spin coater, and the like. Examples of the melt extrusion method may include a T-die method, an inflation method, and the like. A forming temperature may be 150 to 350° C. and preferably, may be 200 to 300° C.

In the case of forming the film using the T-die method, a T-die is mounted on a front edge of a single screw extruder or a double-screw extruder and a film extruded to have a film shape is rolled to thereby obtain a roll-shaped film. In this case, the rolled film may be stretched in an extruding direction and thus, may be uniaxially stretched by appropriately adjusting a temperature of the rolled film. In addition, the film is stretched in a direction perpendicular to the extruding direction, such that simultaneous biaxial stretching and sequential biaxial stretching thereof and the like may be performed.

The acrylic film may be a non-stretched film or a stretched film. In the case of the stretched film, the stretched film may be a uniaxially stretched film or a biaxially stretched film. In the case of the biaxially stretched film, the biaxially stretched film may be a simultaneously biaxially stretched film or a sequentially biaxially stretched film. In the case in which the film is biaxially stretched, mechanical strength thereof may be enhanced and performance of the film may be improved. The acrylic film may be mixed with other thermoplastic resins, such that an increase in phase differences may be suppressed even in the case of stretching the film, and optical isotropy thereof may be maintained.

A stretching temperature may be within a range around a glass transition temperature of the thermoplastic resin composition, a raw material of the film. The stretching temperature may preferably be within a range of (glass transition temperature−30° C.) to (glass transition temperature+100°

C.), more preferably, within a range of (glass transition temperature–20° C.) to (glass transition temperature+80° C.). When the stretching temperature is lower than (glass transition temperature–30° C.), a sufficient stretching ratio may not be obtained. On the other hand, when the stretching temperature is greater than (glass transition temperature+100° C.), the flow of the resin composition may occur, such that stable stretching may not be carried out.

A stretching ratio defined by an area ratio may be preferably 1.1 to 25 times, more preferably 1.3 to 10 times. When the stretching ratio is lower than 1.1 times, improvements in toughness, accompanied with the stretching may not be obtained. When the stretching ratio is greater than 25 times, an effect according to an increase in stretching ratio may be insufficient.

A stretching speed in one direction may be 10 to 20,000%/min, preferably, 100 to 10.000%/min. When the stretching speed is less than 10%/min, a relatively long period of time is required in order to obtain a sufficient stretching ratio, causing an increase in manufacturing costs. When the stretching speed is greater than 20,000%/min, fracturing of the stretched film may occur.

The acrylic film may be subjected to a thermal treatment (annealing) or the like after the stretching thereof in order to stabilize optical isotropy or mechanical properties thereof. Conditions for the thermal treatment are not particularly limited, and any appropriate conditions commonly known in the art may be employed.

Meanwhile, a surface treatment for improvements in adhesive strength may be performed with respect to the acrylic film, if necessary. For example, at least one surface treatment selected from a group consisting of an alkali treatment, a corona treatment, and a plasma treatment may be performed on at least one surface of an optical film.

Meanwhile, the polarizing plate according to an exemplary embodiment of the present disclosure may further include a pressure sensitive adhesive (PSA) on the protective layer in order to be attached to an optical film such as a display panel or a retardation film, if necessary.

In this case, the pressure sensitive adhesive (PSA) may be formed by using various bonding agents commonly known in the technical field, and types of the bonding agents are not particularly limited. For example, the pressure sensitive adhesive (PSA) may be formed using a rubber bonding agent, an acrylic bonding agent, a silicon bonding agent, a urethane bonding agent, a polyvinyl alcohol bonding agent, a polyvinyl pyrrolidone bonding agent, a polyacrylamide bonding agent, a cellulose bonding agent, a vinyl alkyl ether bonding agent or the like. Among these, the pressure sensitive adhesive (PSA) may particularly preferably be formed using an acrylic bonding agent in terms of transparency and heat resistance properties and the like.

Meanwhile, the pressure sensitive adhesive (PSA) may be formed by a method of applying a bonding agent to an upper portion of the protective layer or may be formed by a method of attaching a bonding sheet fabricated by drying a bonding agent after applying the bonding agent onto a release sheet, to the upper portion of the protective layer.

A thickness of the pressure sensitive adhesive (PSA) is not limited but may be approximately 10 µm to 80 µm, preferably approximately 20 µm to 60 µm, more preferably approximately 30 µm to 50 µm.

The polarizing plate according to an exemplary embodiment of the present invention may be usefully applied to display devices such as liquid crystal displays, organic light-emitting devices and the like. For example, the display device may be a liquid crystal display including a liquid crystal panel and polarizing plates disposed on both surfaces of the liquid crystal panel. In this case, at least one of the polarizing plates may be the polarizing plate according to an exemplary embodiment of the present invention. In this case, types of the liquid crystal panel included in the liquid crystal display are not particularly limited. For example, types of panels are limited and for example, a passive matrix panel such as a twisted nematic (TN) type panel, a super twisted nematic (STN) type panel, a ferroelectric (F) type panel, or a polymer dispersed (PD) type panel; an active matrix panel such as a two terminal type panel or a three terminal type panel; an in-plane switching (IPS) panel; and a vertical alignment (VA) panel may be all used. Also, types of other components constituting the liquid crystal display, for example, types of upper and lower substrates (i.e. color filter substrate or array substrate) are not particularly limited, and components commonly known in the art may be employed without any limitation.

MODE FOR DISCLOSURE

Hereinafter, the present disclosure will be described in more detail with reference to concrete Examples.

Inventive Example 1

Composition A 3 parts by weight of a radical initiator, phenylbis(2,4,6-trimethylbenzoyl)-phosphine oxide was mixed with 100 parts by weight of resin fabricated by adding 4.3 parts by weight of ethylene glycol monovinyl ether, 5.7 parts by weight of a maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition A was prepared.

Inventive Example 2

Composition B 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.3 parts by weight of ethylene glycol monovinyl ether, 5.7 parts by weight of a maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition B was prepared.

Inventive Example 3

Composition C 3 parts by weight of a radical initiator, phenylbis(2,4,6-trimethylbenzoyl)-phosphine oxide was mixed with 100 parts by weight of resin fabricated by adding 4.3 parts by weight of ethylene glycol monovinyl ether, 5.7 parts by weight of a maleic acid, 60 parts by weight of 4-hydroxybutyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition C was prepared.

Inventive Example 4

Composition D 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.3 parts by weight of ethylene glycol monovinyl ether, 5.7 parts by weight of a maleic acid, 60 parts by weight of 4-hydroxybutyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition D was prepared.

Inventive Example 5

Composition E 3 parts by weight of a radical initiator, phenylbis(2,4,6-trimethylbenzoyl)-phosphine oxide was mixed with 100 parts by weight of resin fabricated by adding 4.3 parts by weight of ethylene glycol monovinyl ether, 5.7 parts by weight of a maleic acid, 60 parts by weight of 2-hydroxypropyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition E was prepared.

Inventive Example 6

Composition F 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.3 parts by weight of ethylene glycol monovinyl ether, 5.7 parts by weight of a maleic acid, 60 parts by weight of 2-hydroxypropyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition F was prepared.

Inventive Example 7

Composition G 3 parts by weight of a radical initiator, phenylbis(2,4,6-trimethylbenzoyl)-phosphine oxide was mixed with 100 parts by weight of resin fabricated by adding 4.3 parts by weight of ethylene glycol monovinyl ether, 5.7 parts by weight of a furmaric acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition G was prepared.

Inventive Example 8

Composition H 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.3 parts by weight of ethylene glycol monovinyl ether, 5.7 parts by weight of a furmaric acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition H was prepared.

Inventive Example 9

Composition I 3 parts by weight of a radical initiator, phenylbis(2,4,6-trimethylbenzoyl)-phosphine oxide was mixed with 100 parts by weight of resin fabricated by adding 4.7 parts by weight of ethylene glycol monovinyl ether, 5.3 parts by weight of an angelic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition I was prepared.

Inventive Example 10

Composition J 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.7 parts by weight of ethylene glycol monovinyl ether, 5.3 parts by weight of an angelic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition J was prepared.

Inventive Example 11

Composition K 3 parts by weight of a radical initiator, phenylbis(2,4,6-trimethylbenzoyl)-phosphine oxide was mixed with 100 parts by weight of resin fabricated by adding 4.6 parts by weight of tert-butyl vinyl ether, 5.4 parts by weight of a maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition K was prepared.

Inventive Example 12

Composition L 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.6 parts by weight of tert-butyl vinyl ether, 5.4 parts by weight of a maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition L was prepared.

Inventive Example 13

Composition M 3 parts by weight of a radical initiator, phenylbis(2,4,6-trimethylbenzoyl)-phosphine oxide was mixed with 100 parts by weight of resin fabricated by adding 5 parts by weight of 1,4-butanolvinylether, 5 parts by weight of a maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition M was prepared.

Inventive Example 14

Composition N 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 5 parts by weight of 1,4-butanolvinylether, 5 parts by weight of a maleic acid, 60 parts by weight of 2-hydroxyethyl acrylate, and 30 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition N was prepared.

Inventive Example 15

Composition O 3 parts by weight of a radical initiator, phenylbis(2,4,6-trimethylbenzoyl)-phosphine oxide was mixed with 100 parts by weight of resin fabricated by adding 4.3 parts by weight of ethylene glycol monovinyl ether, 5.7 parts by weight of a maleic acid, 60 parts by weight of 2-hydroxyethyl acrylate, and 30 parts by weight of 6,6'-(((((propane-2,2-diylbis(4,1-phenylene))bis(oxy))bis(1-(acryloyloxy)propane-3,2-diylbis))bis(oxy))bis(carbonyl))bis(cyclohex-3-N carboxylic acid) (Acid value 142 KOH/g), whereby composition 0 was prepared.

Inventive Example 16

Composition P 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.3 parts by weight of ethylene glycol monovinyl ether, 5.7 parts by weight of a maleic acid, 60 parts by weight of 2-hydroxyethyl acrylate, and 30 parts by weight of 6,6'-(((((propane-2,2-diylbis(4,1-phenylene))bis(oxy))bis(1-(acryloyloxy)propane-3,2-diylbis))bis(oxy))bis(carbonyl))bis(cyclohex-3-N carboxylic acid) (Acid value 142 KOH/g), whereby composition P was prepared.

Inventive Example 17

Composition Q 3 parts by weight of a radical initiator, phenylbis(2,4,6-trimethylbenzoyl)-phosphine oxide was mixed with 100 parts by weight of resin fabricated by adding 4.3 parts by weight of ethylene glycol monovinyl ether, 5.7 parts by weight of a maleic acid, 60 parts by weight of 2-hydroxyethyl acrylate, and 30 parts by weight of 4-((1-(5-(3-(2-((3-carboxypropanoyl)oxy)-3-(methacryloyloxy) propoxy)-4-(methylbenzene)-2-methylphenoxy)-3-(methacroyloxy)propane-2-yl)oxy)-4-oxobutanoic acid (Acid value 157 KOH/g), whereby composition Q was prepared.

Inventive Example 18

Composition R 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 4.3 parts by weight of ethylene glycol monovinyl ether, 5.7 parts by weight of a maleic acid, 60 parts by weight of 2-hydroxyethyl acrylate, and 30 parts by weight of 4-((1-(5-(3-(2-((3-carboxypropanoyl)oxy)-3-(methacryloyloxy) propoxy)-4-(methylbenzene)-2-methylphenoxy)-3-(methacroyloxy)propane-2-yl)oxy)-4-oxobutanoic acid (Acid value 157 KOH/g), whereby composition R was prepared.

Comparative Example 1

Composition S 3 parts by weight of a radical initiator, phenylbis(2,4,6-trimethylbenzoyl)-phosphine oxide was mixed with 100 parts by weight of resin fabricated by adding 60 parts by weight of 2-hydroxyethyl acrylate and 40 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition S was prepared.

Comparative Example 2

Composition T 3 parts by weight of a radical initiator, phenylbis(2,4,6-trimethylbenzoyl)-phosphine oxide and 5 parts by weight of a photoacid generator, diphenyl(4-phenylthio)phenylsulfonium hexafluorophosphate were mixed with 100 parts by weight of resin fabricated by adding 60 parts by weight of 2-hydroxyethyl acrylate and 40 parts by weight of 4,4'-((((propane-2,2-diylbis(4,1-phenylene))bis(oxy))bis(1-(methacryloyloxy)propane-3,2-diyl))bis(oxy))bis(4-oxobutanoic acid) (Acid value of 157 KOH/g), whereby composition T was prepared.

Experimental Example

After the radically curable compositions A to T prepared according to the Inventive Examples 1 to 18 and the Comparative Examples 1 to 2 were respectively applied to Polarizers, the Polarizers were stacked and passed through a laminator and subsequently, 900 mJ/cm² of ultraviolet light was irradiated thereonto to thereby fabricate samples. The fabricated samples were cut so as to have widths of 20 mm and lengths of 100 mm and then, were left for 4 days under conditions of 70% relative humidity. Thereafter, the Polarizers were peeled off at a rate of 300 mm/min and at 90 degrees to thereby measure peel strength. The measurement results of peel strength are described in the following [Table 1]. In a case in which peel strength was 3.0N/cm or more, the case was considered to be very excellent. In a case in which peel strength was equal to or greater than 2.0N/cm but less than 3.0N/cm, the case was considered to be excellent. In a case in which peel strength was equal to or greater than 1.0N/cm but less than 2.0N/cm, the case was considered to be good. In a case in which peel strength was equal to or greater than 0.5N/cm but less than 1.0N/cm, the case was considered to be poor. In a case in which peel strength was less than 0.5N/cm, the case was considered to be severely poor.

TABLE 1

| Classification | Composition | Thickness of Protective layer (μm) | Adhesion properties |
|---|---|---|---|
| Inventive Example 1 | A | 5 | Very excellent |
| Inventive Example 2 | B | 5 | Excellent |
| Inventive Example 3 | C | 5 | Excellent |
| Inventive Example 4 | D | 5 | Excellent |
| Inventive Example 5 | E | 5 | Excellent |
| Inventive Example 6 | F | 5 | Excellent |
| Inventive Example 7 | G | 5 | Good |
| Inventive Example 8 | H | 5 | Good |
| Inventive Example 9 | I | 5 | Good |
| Inventive Example 10 | J | 5 | Good |
| Inventive Example 11 | K | 5 | Good |
| Inventive Example 12 | L | 5 | Good |
| Inventive Example 13 | M | 5 | Good |
| Inventive Example 14 | N | 5 | Good |
| Inventive Example 15 | O | 5 | Good |
| Inventive Example 16 | P | 5 | Good |
| Inventive Example 17 | Q | 5 | Excellent |
| Inventive Example 18 | R | 5 | Excellent |
| Comparative Example 1 | S | 5 | Severely poor |
| Comparative Example 2 | T | 5 | Poor |

While the present disclosure has been shown and described in connection with the embodiments, it will be apparent to those skilled in the art that modifications and variations can be made without departing from the spirit and scope of the disclosure as defined by the appended claims.

What is claimed:

1. A polarizing plate comprising: a polarizer and a protective layer formed on at least one surface of the polarizer,
wherein the protective layer is formed of a cured product of a radically curable composition including a compound represented by Chemical Formula 1; a vinyl ether compound; a carboxylic acid compound including at least one unsaturated double bond; a compound having an acid value of 100 to 1,000 mgKOH/g and a radical initiator,

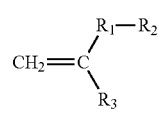

[Chemical Formula 1]

where $R_1$ is an ester group, $R_2$ is a $C_{1-10}$ alkyl group having at least one hydroxy substituent or a $C_{4-10}$ cycloalkyl group having at least one hydroxy substituent, and $R_3$ is hydrogen or methyl, and wherein the compound having an acid value of 100 to 1,000 mgKOH/g is at least one selected from the group consisting of compounds represented by Chemical Formulas 10 to 21:

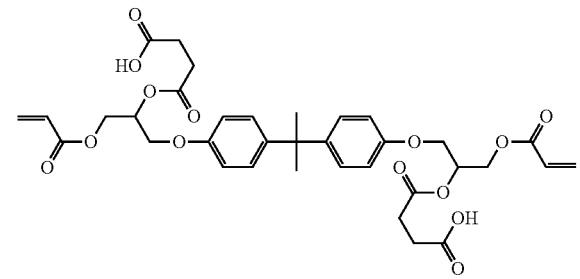

[Chemical Formula 10]

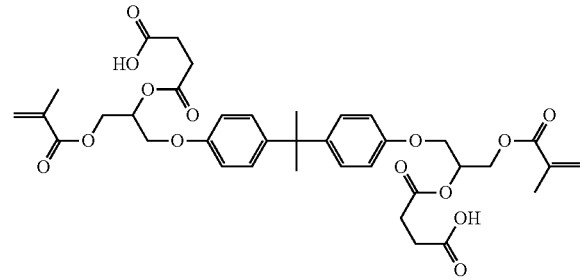

[Chemical Formula 11]

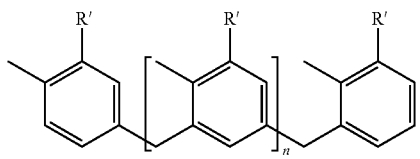

[Chemical Formula 12]

(where, R' is 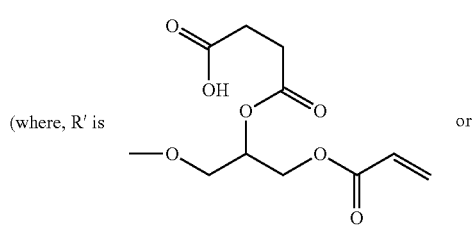 or 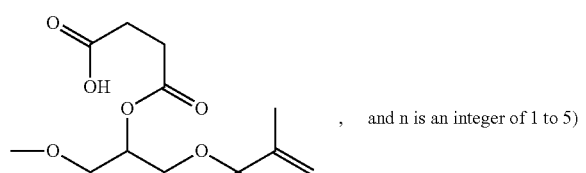, and n is an integer of 1 to 5)

[Chemical Formula 13]

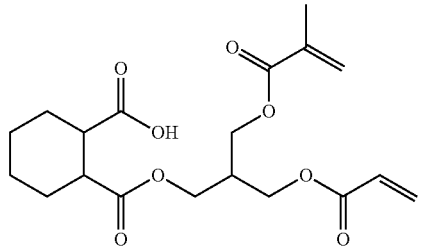

[Chemical Formula 14]

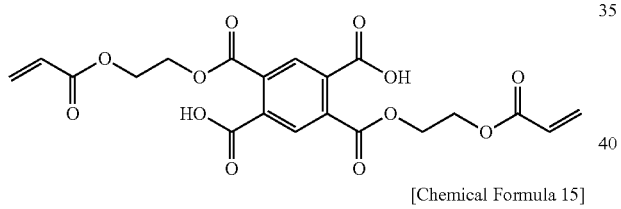

[Chemical Formula 15]

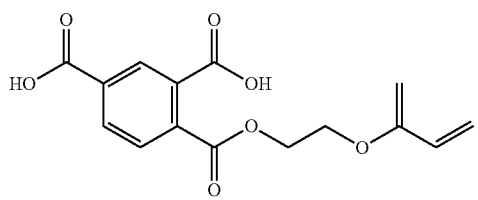

[Chemical Formula 16]

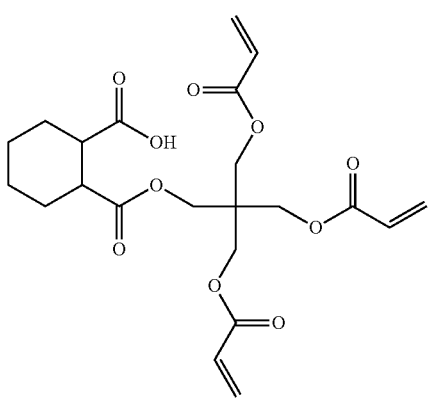

[Chemical Formula 17]

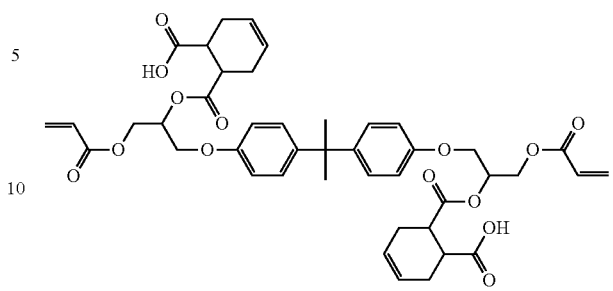

[Chemical Formula 18]

[Chemical Formula 19]

[Chemical Formula 20]

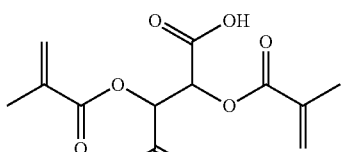

[Chemical Formula 21]

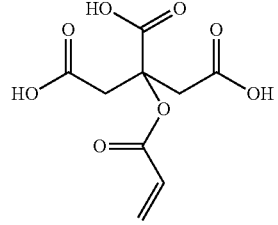

2. The polarizing plate of claim 1, wherein the radically curable composition includes:

40 to 90 parts by weight of the compound represented by Chemical Formula 1;

1 to 50 parts by weight of the vinyl ether compound;

1 to 50 parts by weight of the carboxylic acid compound including at least one unsaturated double bond; 10 to 50 parts by weight of the compound having an acid value of 100 to 1,000 mgKOH/g; and 0.5 to 10 parts by weight of the radical initiator, based on 100 parts by weight of the total composition.

3. The polarizing plate of claim 1, wherein the compound represented by Chemical Formula 1 is at least one selected from among compounds represented by Chemical Formulas 2 to 9:

[Chemical Formula 2]

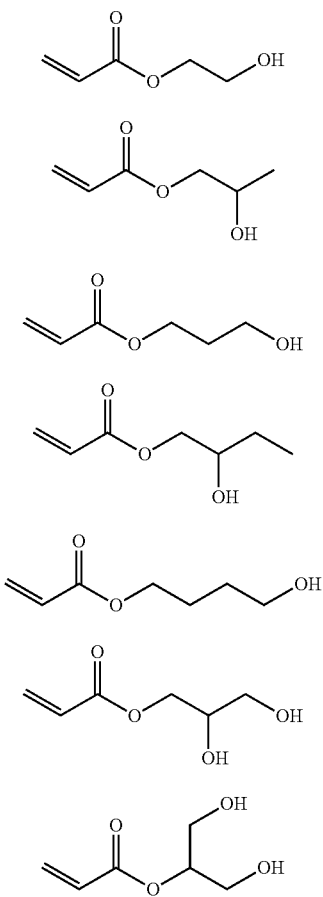

[Chemical Formula 3]

[Chemical Formula 4]

[Chemical Formula 5]

[Chemical Formula 6]

[Chemical Formula 7]

[Chemical Formula 8]

-continued

[Chemical Formula 9]

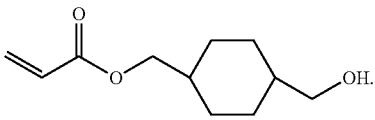

4. The polarizing plate of claim 1, wherein the vinyl ether compound is at least one selected from the group consisting of ethylene glycol monovinyl ether, 1,4-buthanol vinyl ether, di(ethylene glycol) divinyl ether, tri(ethylene glycol) divinyl ether, tert-butyl vinyl ether, 1-(vinyloxy)-2,2-bis((vinyloxy)methyl)butane, 1,3-bis(vinyloxy)-2,2-bis((vinyloxy)methyl)propane and cyclohexyl vinylether.

5. The polarizing plate of claim 1, wherein the carboxylic acid compound including at least one unsaturated double bond is at least one selected from the group consisting of a maleic acid, a fumaric acid, an angelic acid and a tiglic acid.

6. The polarizing plate of claim 1, wherein the radically curable composition further includes: a photoacid generator.

7. The polarizing plate of claim 1, wherein a glass transition temperature of the radically curable composition after curing is 60° C. to 500° C.

8. The polarizing plate of claim 1, further comprising: a protective film attached to a surface of the polarizer, opposite to the surface thereof on which the protective layer is formed, via an adhesive layer.

9. The polarizing plate of claim 8, wherein the protective film is a cellulose film, a polyethylene terephthalate (PET) film, a cycloolefin polymer (COP) film, or an acrylic film.

10. The polarizing plate of claim 1, further comprising: a pressure sensitive adhesive (PSA) formed on the protective layer.

11. A display device comprising: the polarizing plate of claim 1.

\* \* \* \* \*